(12) United States Patent
Matsushima

(10) Patent No.: US 6,666,509 B2
(45) Date of Patent: Dec. 23, 2003

(54) BODY SUPPORT TOOL AND SEAT COVER HOLDING BODY SUPPORT TOOL

(75) Inventor: Seiya Matsushima, Niizashi Saitama (JP)

(73) Assignee: Honda Access Corp., Saitama (JP)

( * ) Notice: Subject to any disclaimer, the term of this patent is extended or adjusted under 35 U.S.C. 154(b) by 35 days.

(21) Appl. No.: 09/810,231

(22) Filed: Mar. 19, 2001

(65) Prior Publication Data

US 2001/0022459 A1 Sep. 20, 2001

(30) Foreign Application Priority Data

Mar. 17, 2000 (JP) ....................................... 2000-075840
Jul. 6, 2000 (JP) ....................................... 2000-204833

(51) Int. Cl.$^7$ ............................................. A47C 31/12
(52) U.S. Cl. ................... 297/219.1; 297/284.5; 297/457.28; 5/653
(58) Field of Search .................... 297/219.1, 284.4, 297/284.5, 452.28; 5/653, 948, 953; 602/19; 428/45

(56) References Cited

U.S. PATENT DOCUMENTS

| | | | | |
|---|---|---|---|---|
| 3,935,355 A | * | 1/1976 | Kuhn ........................ 403/267 |
| 4,042,746 A | * | 8/1977 | Hofer ....................... 428/308.4 |
| 4,347,213 A | * | 8/1982 | Rogers, Jr. ................. 264/510 |
| 4,471,993 A | * | 9/1984 | Watson ..................... 297/284.5 |
| 4,683,877 A | * | 8/1987 | Ersfeld et al. ................. 602/8 |
| 4,770,299 A | * | 9/1988 | Parker ........................ 206/409 |
| 5,632,723 A | * | 5/1997 | Grim ........................... 602/19 |
| 5,842,475 A | * | 12/1998 | Duback et al. ............. 128/846 |
| 5,957,871 A | * | 9/1999 | Darcy .......................... 602/12 |
| 5,983,407 A | * | 11/1999 | McKay ........................... 2/455 |
| 6,027,777 A | * | 2/2000 | Hirano et al. .............. 428/35.4 |
| 6,152,892 A | * | 11/2000 | Masini .......................... 602/6 |
| 6,254,959 B1 | * | 7/2001 | Hirano et al. ................. 428/71 |
| 6,319,217 B1 | * | 11/2001 | Darcey ........................ 602/19 |
| 6,533,971 B1 | * | 3/2003 | Stess et al. ................ 264/40.1 |

* cited by examiner

*Primary Examiner*—Peter M. Cuomo
*Assistant Examiner*—Joseph Edell
(74) *Attorney, Agent, or Firm*—Sughrue Mion, PLLC

(57) ABSTRACT

A body support tool, such as a seat support, is provided, that may hold a shape in conformity with a sitting shape of a user. A cushion body having flexibility is covered with a sheet-like coating member impregnated with cured resin, and brought into contact with a portion of a human body such as the hips, waist, back or neck. When the user sits on the seat, for example, the body support tool cures in conformity with that body portion.

11 Claims, 18 Drawing Sheets

BODY SUPPORT TOOL AND SEAT COVER HOLDING BODY SUPPORT TOOL

BACKGROUND OF THE INVENTION

The present invention relates to a body support tool, used when, for example, a user seats himself or herself on a seat or a chair, such as a seat support that holds a shape in conformity with a user's seat shape (body shape) and by which the fit feeling may be obtained in conformity with the body shape of the individual user, a shoe bottom support by which the fit feeling may be obtained in conformity with the individual user's feet and a seat cover that may hold the body support tool (seat support) in a predetermined position of the seat.

For instance, since a variety of automotive seats are manufactured in conformity with an average user, some users are not satisfied with the fit feeling.

In view of such situation, conventionally, a variety of seat supports (lumber supports) have been proposed as means for solving this problem. Some of them have been put into practical use.

SUMMARY OF THE INVENTION

Accordingly, an object of the present invention is to further seek the practicality of a body support such as seat support to provide a body support tool such as a novel seat support that, for example, may hold a shape in conformity with a sitting shape of a user and enhance a sitting feeling with a good holding property, and that is easy to handle and make.

Also, another object of the invention is to provide a seat cover that may readily hold and fix a body support tool (seat support) to a seat with an esthetic appearance.

According to a first aspect of the invention, there is provided a body support tool characterized in that a cushion body having flexibility is covered with a sheet-like coating member impregnated with cured resin, brought into contact with a portion of a human body such as hips, a waist, a back or a neck when the user sits on a seat or a chair or a sole of foot when the user wears a shoe and used to be cured in conformity with the portion.

Also, in the body support tool according to the first aspect, according to a second aspect, the coating member is formed of impregnating cloth material with the portion.

Also, in the body support tool according to the first or second aspect, according to a third aspect, the cured resin has such characteristics that when the cured resin is exposed to moisture the cured resin is cured in a short period of time or when catalyst liquid is added to the cured resin, the cured resin is cured in a short period of time.

Also, in the body support tool according to any one of the first to third aspects, according to a fourth aspect, the cushion body is made of elastic material in the form of a block, and the cushion body in the form of the block is coated with the sheet-like coating member.

Also, in the body support tool according to the fourth aspect, according to a fifth aspect, the cushion body is formed of a block-shaped foamed member having elasticity and permeability such as sponge, and the block-shaped cushion body is coated with the sheet-like coating member.

Also, in the body support tool according to any one of the first to fifth aspects, according to a sixth aspect, a periphery of the coating member is coated with a cover member having elasticity.

Also, in the body support tool according to the sixth aspect, according to a seventh aspect, the cover member is made of foamed material having a predetermined thickness and having elasticity and permeability, substantially the overall of the coating member is coated by means of the cover member having the predetermined thickness.

Also, in the body support tool according to any one of the aspect to first to seventh aspects, according to an eighth aspect, the coating member is air-tightly received in an anti-humidity bag and cured in a short period of time when the anti-humidity bag is opened and water is added to or water is contained in the coating member so that the coating member is exposed to humidity or the coating member is cured in a short period of time when the anti-humidity bag is opened and catalyst liquid is applied to the coating member.

Also, in the body support tool according to any one of the first to eighth aspect, according to a ninth aspect, a through hole or a through-hole-like cutaway portion is formed in the cushion body or a shape of the cushion body is set so that a portion where a cushion material is not present in a thickness direction is formed, and when the coating member is contacted with the portion of the human body and cured to be formed in conformity with the portion, the coating member on the human body contact side and the coating member on the opposite side facing the coating member on the human body contact side are in contact with each other through the portion where the cushion material is not present and cured to be bonded together.

Also, in the body support tool according to any one of the first to ninth aspects, according to a tenth aspect, comprises a seat support provided in a position where the seat support is brought into contact with a portion of a human body such as hips, a waist, a back or a neck when the user sits on a seat or a chair.

Also, according to an eleventh aspect of the invention, there is provided a seat cover for holding a body support tool characterized in that a seat support holding means for detachably fastening a back surface of a seat cover member having a seat holding means and a receiving member together is provided on the back surface of the seat cover member or an outer surface of the receiving member, the seat holding means being arranged and held so as to at least cover a front surface of a backrest of a seat, and the receiving member receiving a seat support, and the seat support may be held in a predetermined position of the back surface of the seat cover member.

In the seat cover for holding a body support tool according to the eleventh aspect, according to a twelfth aspect, folded portions that are folded back so that the folded portions may cover the receiving member fastened and fixed through the support holding means to the back side of the seat cover member are provided on right and left portions of the seat cover body.

In the seat cover for holding a body support tool according to the twelfth aspect, according to a thirteenth aspect, the back surface of the right and left folded portions of the seat cover member and the receiving member receiving the seat support are fastened and fixed together by the support holding means and the receiving member may be fixed on the back surface of the seat cover member between the right and left folded portions.

In the seat cover for holding a body support tool according to any one of the eleventh to thirteenth aspects, according to a fourteenth aspect, a headrest of an upper portion of the backrest or a headrest engagement portion engaging with a headrest mounting portion is provided in an upper portion of the seat cover member as the seat holding means, and the seat cover member is arranged and held on the front surface of the backrest by the headrest engagement portion.

In the seat cover for holding a body support tool according to the fourteenth aspect, according to a fifteenth aspect an engagement hole for engaging with a headrest mounting rod that is the headrest mounting portion is provided in the upper portion of the seat cover member, and a seat cover member is suspended from the headrest mounting rod to be arranged and held on the backrest front surface.

In the seat cover for holding a body support tool according to any one of the eleventh to fifteenth aspects, according to a sixteenth aspect, a fastening member such as a velcro for detachably fastening on a back surface of the seat cover member is provided on an outer surface of the receiving member as the seat support holding means for fastening and fixing the receiving member receiving the seat support and the back surface of the seat cover member together, to thereby make it possible to change a fixed position of the receiving member.

In the seat cover for holding a body support tool according to any one of the eleventh to sixteenth aspects, according to a seventeenth aspect, an insertion portion which is depressed and inserted between the backrest of the seat and a seat portion is provided at a lower end portion of the seat cover body.

DESCRIPTION OF THE PREFERRED EMBODIMENTS

A specific embodiment of the present invention will now be described in detail with reference to the accompanying drawings.

Figure 1:
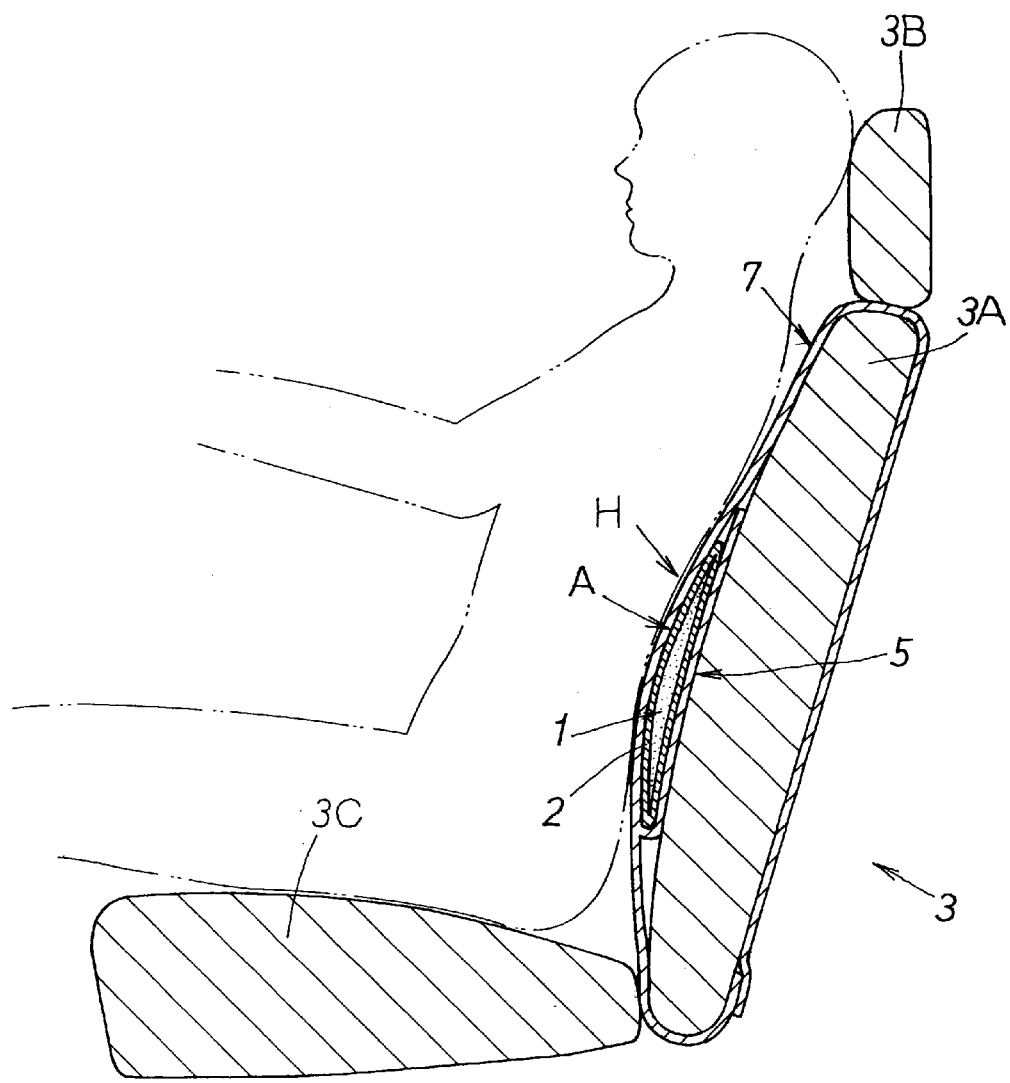
FIG. 1 is an illustrative cross-sectional view showing a used condition in accordance with a first embodiment.
Figure 2:
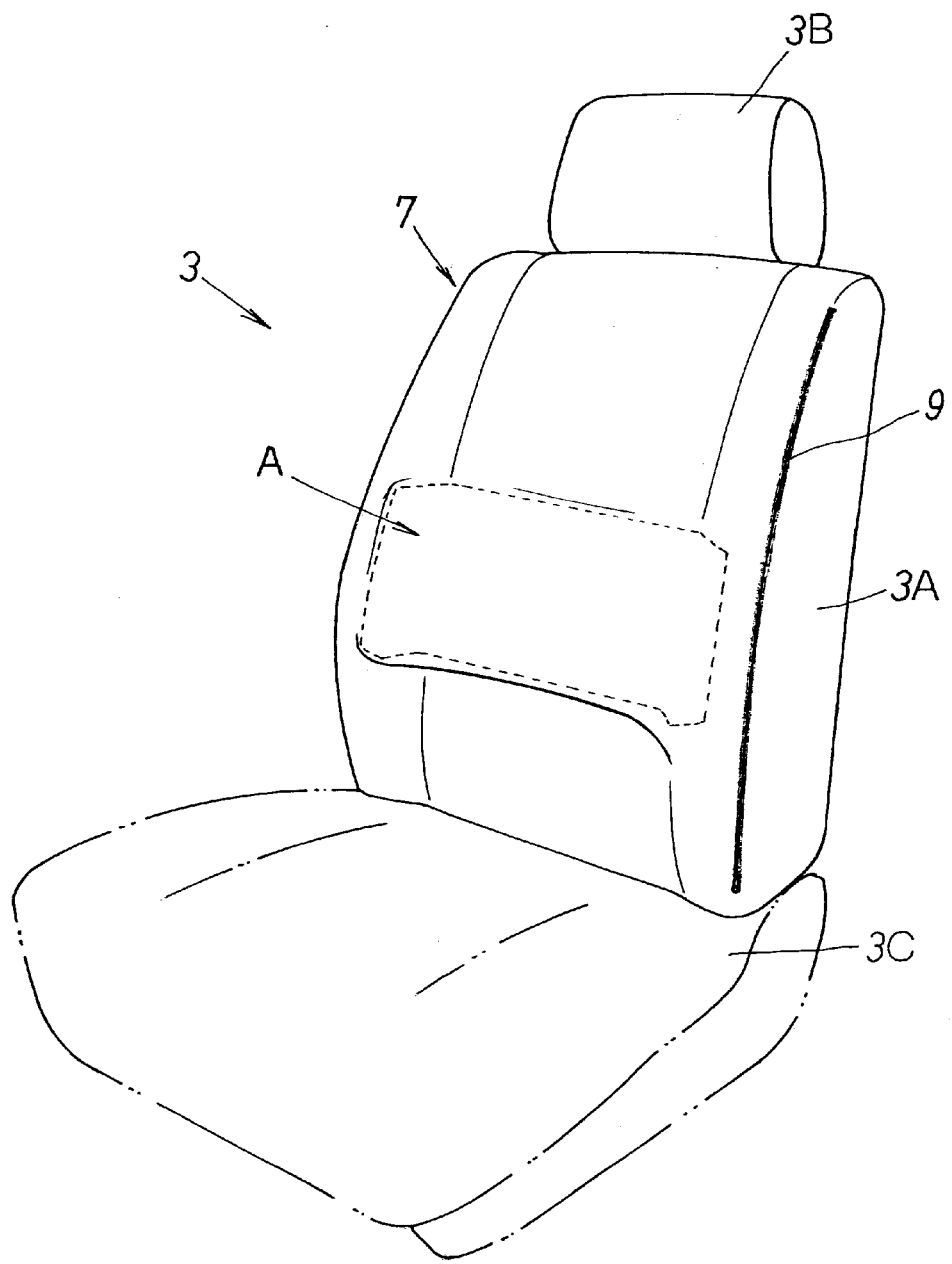
FIG. 2 is an illustrative perspective view showing the used condition in accordance with the first embodiment.

A seat 3 according to this embodiment is applied to an automotive seat 3 as shown in FIGS. 1 and 2.

According to the embodiment, a cushion body 1 having an elasticity is covered by a sheet-like coating member 2 impregnated with cured resin to form a seat support A.

Figure 3:
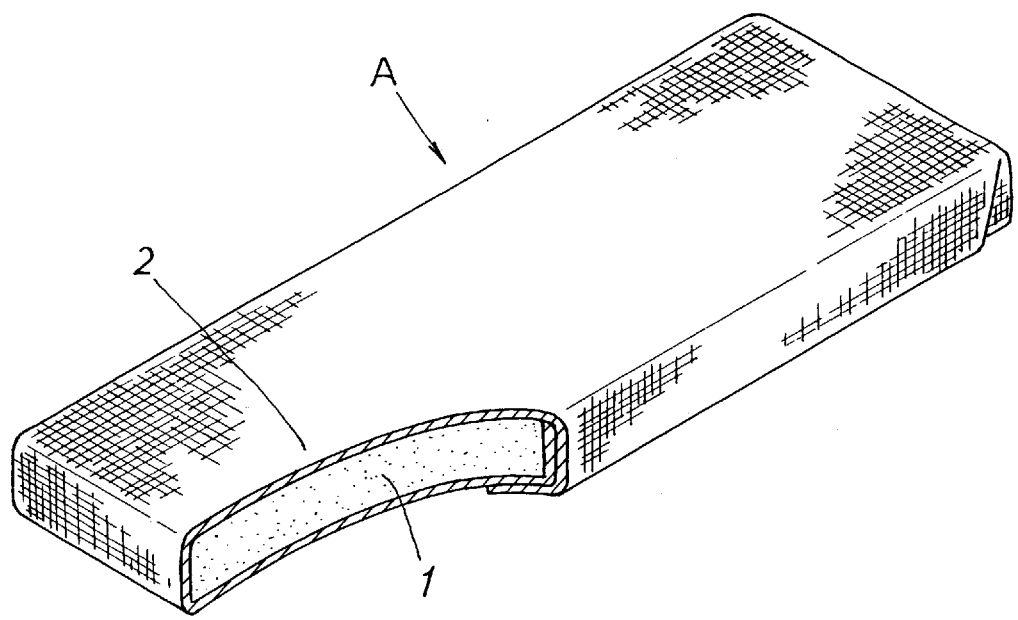
FIG. 3 is a partially fragmentary illustrative perspective view showing a part of the first embodiment.

More specifically, the cushion body 1 is made of block-shaped soft material. Specifically, as shown in FIG. 3, an elongated parallelepiped block-shaped foamed material having a soft property (elasticity) and gas-permeability, such as sponge material, is used as the soft material.

Also, a size of this cushion body 1 is set to be somewhat larger than a body width of a portion H to which the human body is applied, to hold the human body so that the applied portion H is surrounded to ensure extremely good support effect.

A cured resin is impregnated into cloth to form the coating member 2. More specifically, polyester cloth is used as the cloth.

Also, in this embodiment, the overall cushion body 1 may be substantially covered by means of the coating member 2.

More specifically, in this embodiment, two coating members 2 are used. The coating members 2 are overlapped and contacted with each other on the upper and lower surfaces of the cushion body 1, shown in FIG. 3, one by one and thereafter, the overall edge portions of the respective coating members 2 are fixed to each other to form the structure in which the overall cushion body 1 is covered by the two coating members 2.

Incidentally, in the case where the fixed portions of the two coating members 2 are located on the circumferential side surface portion of the cushion body 1 shown in FIG. 3, when the upper and lower surface portions of the seat support A are pressed and molded, the peripheral edge portions of the two coating members 2 largely project to the outside of the circumferential side surface of the cushion body 1 in accordance with the compression deformation of the cushion body 1. Then, since the cushion body 1 is not present in the interior of the projecting fixed portion, this portion becomes hard. Thus, there is a fear to degrade the sitting feeling.

Figure 4A:
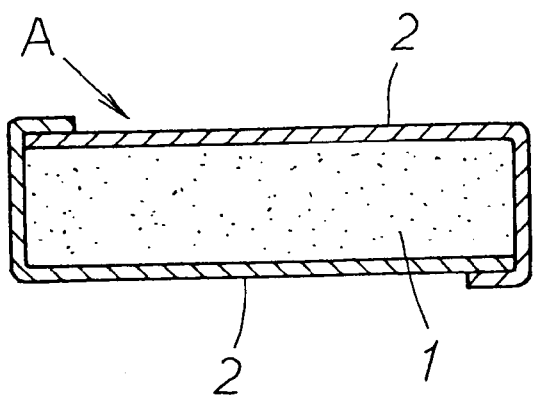
FIGS. 4A and 4B are illustrative cross-sectional views showing the first embodiment.
Figure 4B:
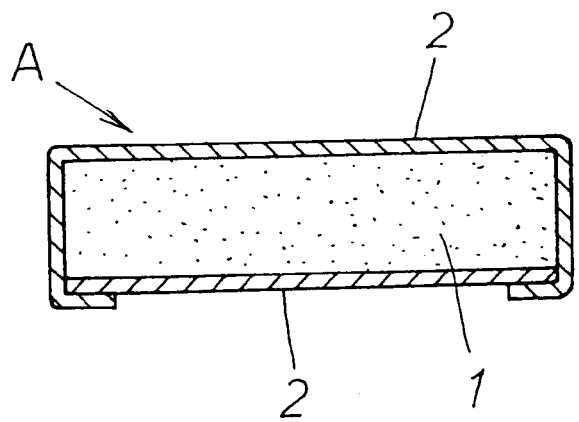

Accordingly, according to the present embodiment, in order to solve this defect, as shown in FIGS. 4A and 4B, the fixed portion is located on the upper and lower surface sides other than the circumferential side surface portion of the cushion body 1 so that the circumferential edge portions of the two coating members 2 are fixed to each other. Namely, when the members are thus fixed, since there is no fear that the cushion body 1 would largely project toward the outside of the circumferential side surface upon the pressing deformation of the cushion body 1, it is possible to obtain an excellent cushioning effect even at a position where the fixed portion is present. Incidentally, FIG. 4A shows a case where the fixed portions are located on both sides of the upper and lower surfaces of the cushion body 1, and FIG. 4B shows a case where the fixed portions are located only on either side of the upper and lower surfaces of the cushion body 1.

Incidentally, it is preferable that the fixing means for the two coating members 2 be an easy fixing means such as weaving, taping, clipping, staplers or the like.

Also, a moisture-curing type resin such as humidity curing urethane having such a property that water is applied to the resin or moisture is contained in the resin so that the resin is exposed in the moisture to thereby cure in a short period of time is used as the curing resin impregnated into the coating members 2.

Also, as one meeting with these conditions and suitable for the coating members 2 of the present embodiment in addition to those described above, for instance, cast products made by 3M Health Care Co., Ltd. are available on the market. The cast products have such property that when dipped in the water the products cure firmly in a very short period of time.

Also, in addition, it is possible to use, as the curing resin, one (catalyst curing type resin) having such a property that the resin cures in a short period of time by adding (spraying) catalyst liquid to a main agent. Also, it is possible to use one having other characteristics. However, if the resin cures in accordance with some trigger, as in the present embodiment, there is no fear that the resin would cure unintentionally. Thus, it is preferable to use the resin in accordance with this embodiment since the resin is convenient to convey or recirculate, and the seat support A may be formed as desired.

Figure 5:
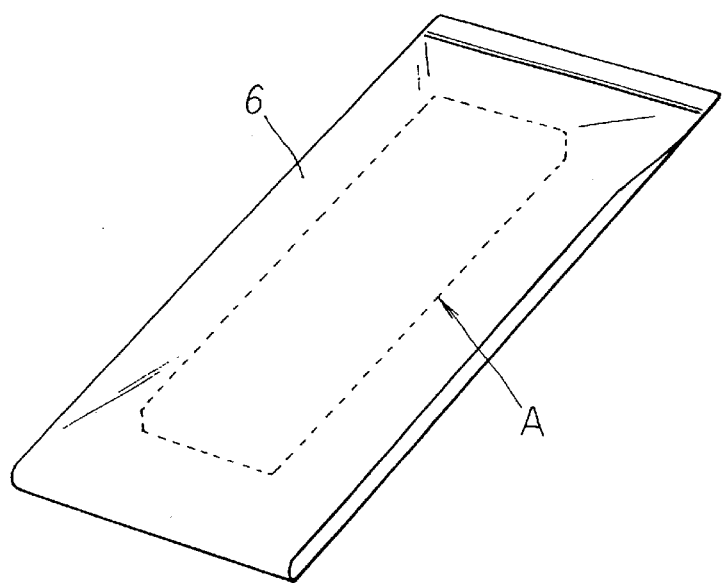
FIG. 5 is an illustrative perspective view showing a condition that a seat support is received in an anti-humidity bag according to the first embodiment.
Figure 6A:
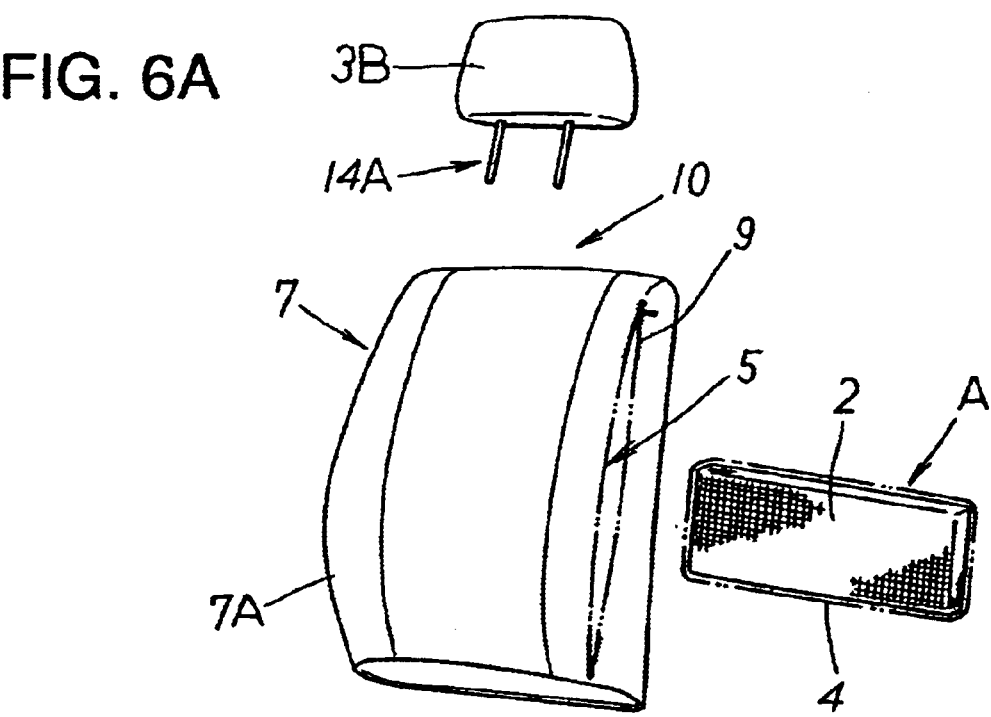
FIGS. 6A and 6B are an exploded illustrative perspective view showing a condition that the seat support, a seat cover (backrest cover) and a seat in accordance with the first embodiment are separated from each other.
Figure 6B:
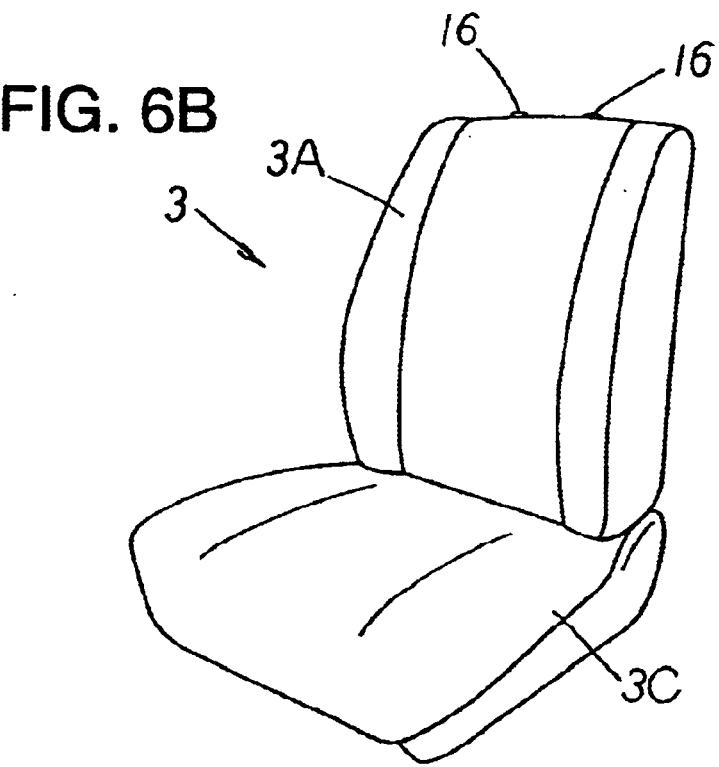

Also, in any case, as shown in FIG. 5, the seat support A in accordance with the present embodiment is gas-tightly sealed in an anti-humidity bag 6. Accordingly, since under this condition there is no fear that the coating members 2 are exposed to moisture, it is possible to prevent the cure without fail. The anti-humidity bag 6 (air-tight gas bag 6) is opened to add the water or moisture so that the seat support A is exposed to humidity whereby the coating members 2 cure in a short period of time.

Also, the seat support A in accordance with this embodiment may be held in a support holding means 5 provided in the seat 3 (a seat cover member 7 provided for the seat 3).

More specifically, in the embodiment, as shown in FIGS. 1, 2, 6A and 6B, the above-described support holding means 5 is provided in the seat cover member 7 covering and fitting over the seat 3.

Specifically, a backrest cover 7A covering and fitting over a backrest portion 3A of the seat 3 is provided. A side portion open type receiving bag that may receive the seat support A in accordance with the embodiment is formed in the inside surface at an intermediate portion of the front surface portion of the backrest cover 7A and is used as the above-described support holding means 5. Namely, in the embodiment shown in FIGS. 1, 2 and 6, there is shown a used condition that the body support tool serves as a seat support for supporting a back portion of the user.

Also, a fastener 9 is provided in a side surface portion of the backrest cover 7A. The fastener 9 is opened and closed to open and close the opening portion on the side portion of the support holding means 5 so that the seat support A may be introduced or removed. Accordingly, if the fastener 9 is closed, the outer appearance of the seat support A cannot be seen from the outside at all. Under this held condition (mounted condition), the esthetic appearance of the seat 3 may be kept in a very good level.

Figure 7:
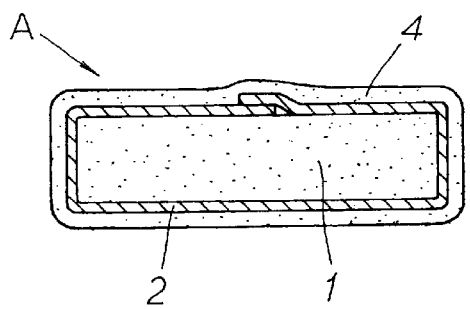
FIG. 7 is an illustrative cross-sectional view showing a second embodiment.

Incidentally, so far, the embodiment (first embodiment) of the seat support A in which the cushion body 1 is covered by means of the coating members 2 is shown. However, FIG. 7 shows an embodiment (second embodiment) of a seat support A in which the peripheral portion of the coating members 2 are further covered (surrounded) by means of a cover member 4 having soft property.

More specifically, the cover member 4 is made of foamed material with a small thickness having soft property and permeability. The overall coating member 2 is substantially coated by means of the sheet-like cover member 4. Also, the cover member 4 is set at a thickness dimension by which the good cushioning effect may be obtained when the user sits without over increasing the thickness of the seat support A per se so that the support becomes too large in size.

Accordingly, it is possible to prevent the cured resin from sticking to the seat 3 to contaminate the latter. In addition, upon handling, the user touches this cover member 4. Accordingly, it is possible to prevent for the user from touching the coating member 2 pregnated with the cured resin. Thus, the seat support A is handled by means of hands of the user to make it possible to perform the molding work. Accordingly it is possible to further facilitate the handling.

Also, since the structure of the first embodiment is further covered by means of the foamed material (cover member 4) having the soft property, a better cushioning effect is obtained than that of the first embodiment. Also, since the cover member 4 has permeability so that the member is not humid, it is possible to insure improved comfort.

Also, in this embodiment, the case is shown in which a single coating member 2 is caused to surround and cover the circumferential surface of the cushion body 1 and the fixed portion of both ends of the coating member 2 is located in either one of the upper and lower surfaces of the cushion body 1.

Incidentally, since the other structure is the same as those of the above-described first embodiment, the details of the explanation and drawing therefor will be omitted.

A method of making the above-described first and second embodiments will now be described.

The seat support A is removed from the anti-humidity bag 6.

After this seat support A is dipped into the water or the water is added to the coating member 2, the water is removed. Incidentally, the seat support A according to the second embodiment may be handled by the hands. However since the seat support A according to the first embodiment is kept under the condition that the coating members 2 impregnated with the hard resin are exposed, rubber gloves are used to perform the mounting work.

In this case, since the hard resin impregnated into the coating member 2 has such characteristics that the member is exposed to humidity by adding the water or moisture, the resin starts to cure.

The fastener 9 of the seat cover member 7 (backrest cover 7A) covering and fitting over the backrest portion 3A of the seat 3 is opened, the laterally extending seat support A according to this embodiment is inserted into the support holding means 5, and the fastener 9 is closed.

Subsequently, when the seat support A is depressed and deformed while the user seats himself or herself, the coating member 2 is solidified in the depressed and deformed condition in a short period of time (three to five minutes). The cushion body 1 also may be kept in the deformed shape by this solidified layer (coating member 2).

Accordingly, in accordance with the present embodiment, with the above-described structure, it is possible to readily form the seat support A having the sitting shape of the individual user in a short period of time. In addition, the portion of the seat support A in contact with the seat 3 is solidified in the form in conformity with the seat 3. It is therefore possible to set the seat support A under the condition that the seat support A is hardly displaced to the seat. Also, since the coating member 2 is solidified to hold the shape while the content of the seat support A is the cushion body 1 having the soft property and the permeability, the seat support A is not only hard but also suitably soft. Also, because of the permeability, the seat support A is not humid even when the support is used for a long period of time, thereby ensuring a good holding property and sitting feeling.

Also, the block-shaped foamed material (cushion body 1) is simply covered only by the polyester cloth (coating member 2) impregnated with the hard resin to thereby form the seat support A according to the embodiment. Accordingly, it is possible to readily make feasible the design of the structure to make it possible to provide the less expensive products that are excellent in mass-production property.

Also, the above-described sheet-like coating member 2 is formed by the step of impregnating the polyester cloth with the hard resin. It is easy to impregnate the polyester cloth with the hard resin. It is easy to produce the sheet-like coating member 2.

Also, conventionally, the hard resin was impregnated into the foamed material having the permeable foams to attempt to obtain the seat support A. However, new hard resin injecting equipment for injecting the hard resin into the foamed material for this structure was by no means dispensed with.

In view of this defect, according to the present embodiment (the present invention), in order to provide the structure for impregnating the polyester cloth with the hard resin, it is possible to readily form the coating material 2 to be cured by utilizing the conventional equipment to the conventional material and in addition, the cushion body 1 such as sponge is simply coated by the coating member 2 to thereby form the seat support A in low cost that exhibit the above-described advantage. It is therefore possible to provide the seat support A that is superior in mass-production property with a simple structure and in low cost.

Also, since the coating member 2 is tightly sealed in the anti-humidity bag 6, as far as the coating member is picked out of the anti-humidity bag 6, it is possible to prevent the coating member 2 from curing without fail and it is extremely easy to handle or carry the seat support.

Also, in a third embodiment shown in FIGS. 9 to 12, through holes 8A or through-hole-like cutaways 8B are formed in a cushion body 1 or the shape of the cushion body 1 is set so that portions 8 where the cushion material is removed in the thickness direction of the cushion body 1 are formed. When the portion H of the human body comes into contact with the cushion body 1 to cure the material and to form the shape in conformity with the portion H, the above-described coating member 2A on the contact side with the human body and the above-described coating member 2B facing the coating member 2A are brought into contact with each other through the portion 8 where the cushioning material is not present and bonded by the curing.

More specifically, the through holes 8A or the through-hole-like cutaways 8B are formed in the cushion body 1 so that the portions 8 where the cushion material is not present are formed inside the outer periphery of the cushion body 1.

Accordingly, even if the coating member 2 is not completely cured, since the top and bottom of the coating member 2 are brought into direct contact with each other, the spring back of the above-described cushion body 1 is suppressed and hard to work. As a result, the shape of the cushion body 1 is hardly changed.

Accordingly, if the coating member 2 cures to some extent and even if the depressing force of the human body is weakened, then the shape is no longer changed.

It is thus possible to enhance the curing holding property of the human body support tool A. As a result, it is possible to hold and form the support in conformity with the portion H of the human body. It is possible to shorten the time during which the human body must push the support. Namely, it is possible to quickly hold (form) the support in the shape in conformity with the body shape by which the good holding property or sitting feeling may be ensured. Thus, it is possible to provide a quite novel human body support tool.

Figure 10:
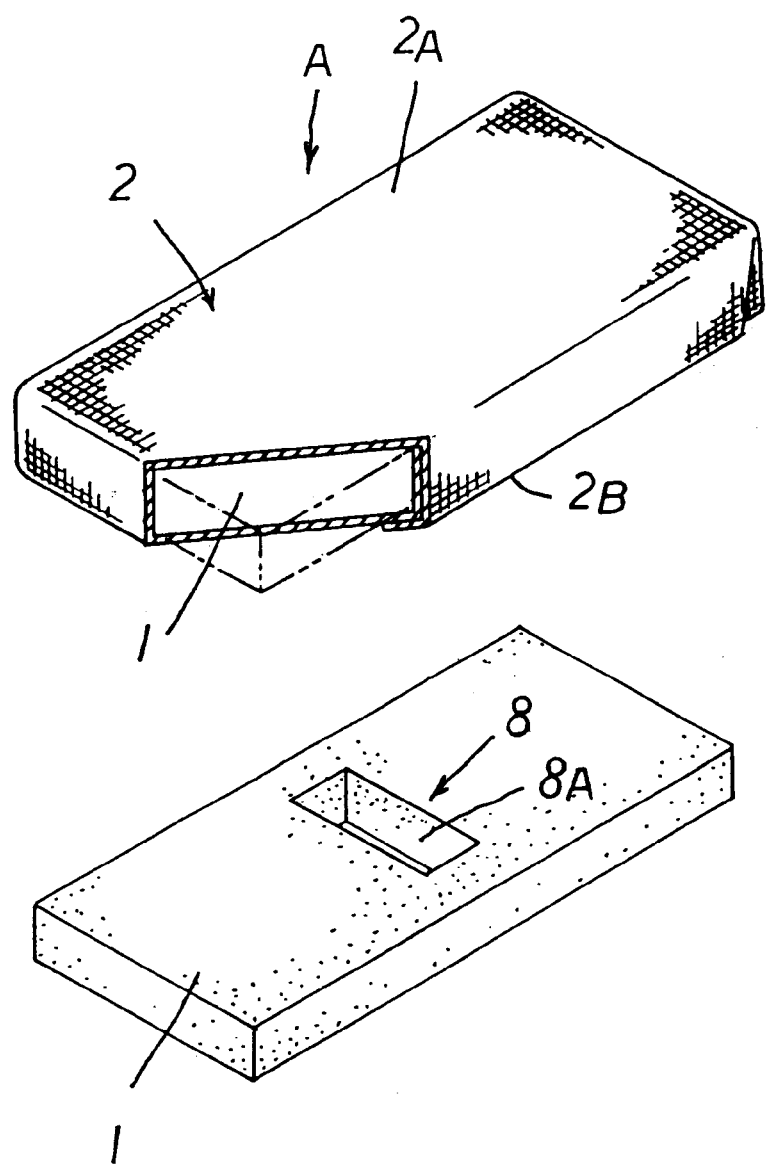
FIG. 10 is an illustrative perspective view of the third embodiment.
Figure 11A:
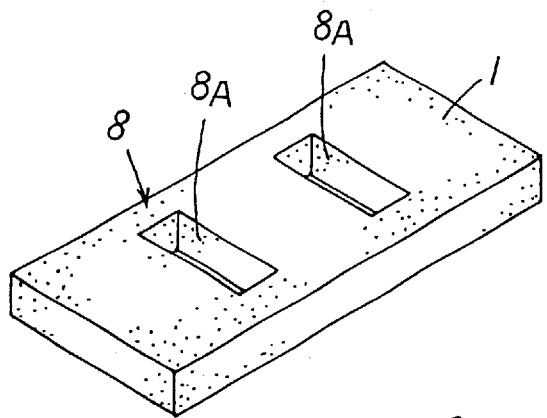
FIGS. 11A, 11B, 11C and 11D are illustrative perspective views showing different modifications of a cushion body according to the third embodiment.
Figure 11B:
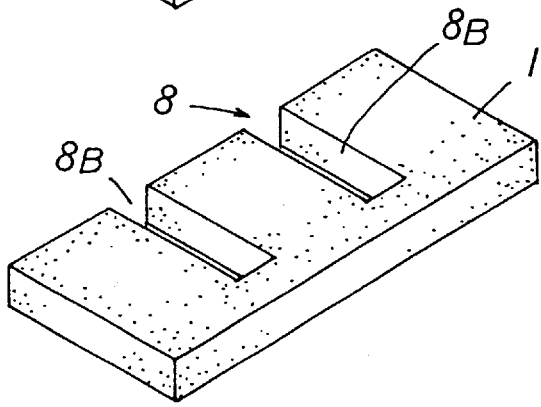
Figure 11C:
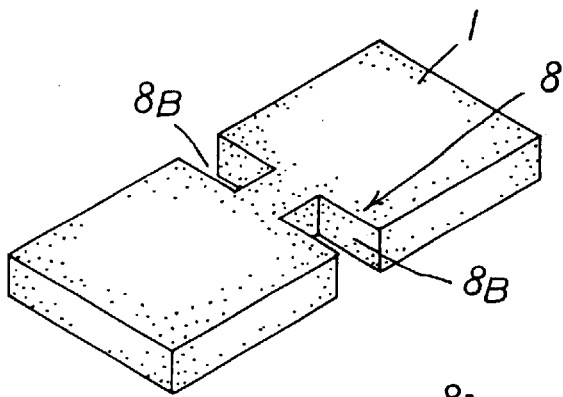
Figure 11D:
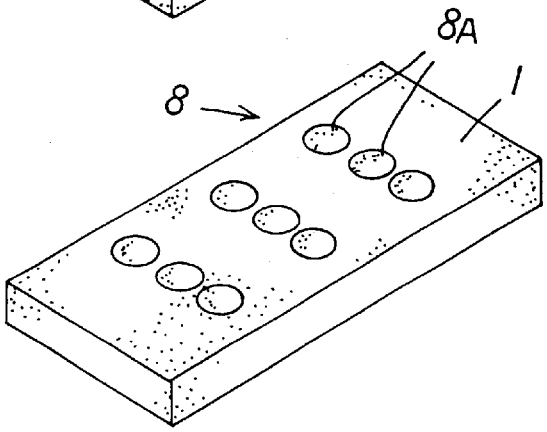

More specifically, as shown in FIG. 10 and FIGS. 11A, B, C and D, the shape, position and number of the through holes 8A and the cutaways 8B are selected so that the spring back is prevented by the above-described top and bottom bonding.

Figure 12A:
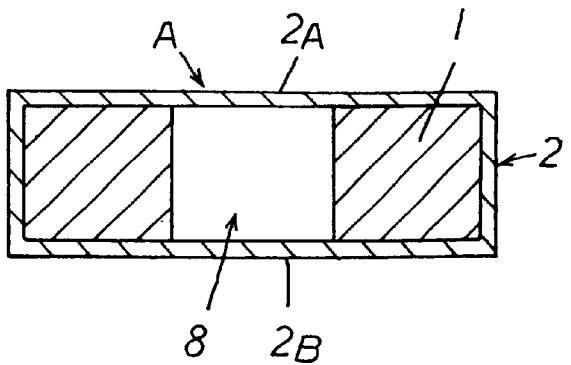
FIGS. 12A, 12B and 12C are illustrative cross-sectional views showing different coating examples of coating members and different shapes of the cushion body according to the third embodiment.
Figure 12B:
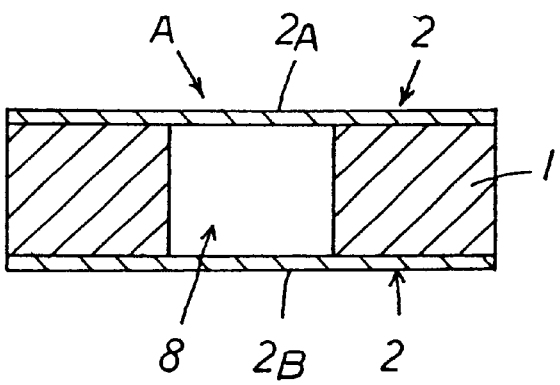
Figure 12C:
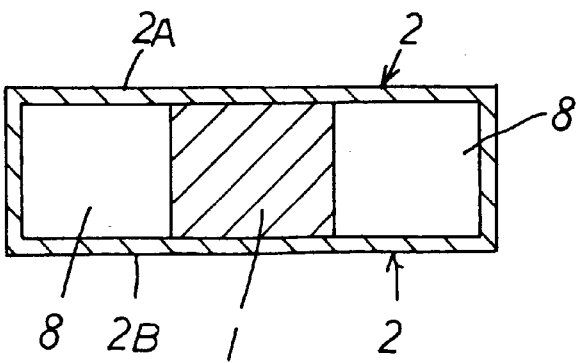

For example, in the case where a large spring back is expected, the size of the through holes 8A or cutaways 8B is enlarged or the number thereof is increased. In the case where a small spring back is expected, the size may be reduced or one through hole may be sufficient. Also, as shown in FIG. 12C, the shape of the cushion body 1 is selected so that the portions 8 where the cushion material is not present in the thickness direction of the cushion body 1 are formed on the outer sides (right and left sides). When the portion H of the human body comes into contact with the support to cure the cushion material in conformity with the shape of the portion H the above-described coating member 2A on the contact side with the human body and the above-described coating member 2B facing the coating member 2A may be brought into contact with each other through the portion 8 where the cushioning material is not present and bonded by the curing. Also, as shown in FIG. 12B, the cushion bodies 1 each having a predetermined shape and separated on the right and left are arranged so that the portion 8 where the cushion material is not present between the cushion bodies 1 may be formed.

Figure 13:
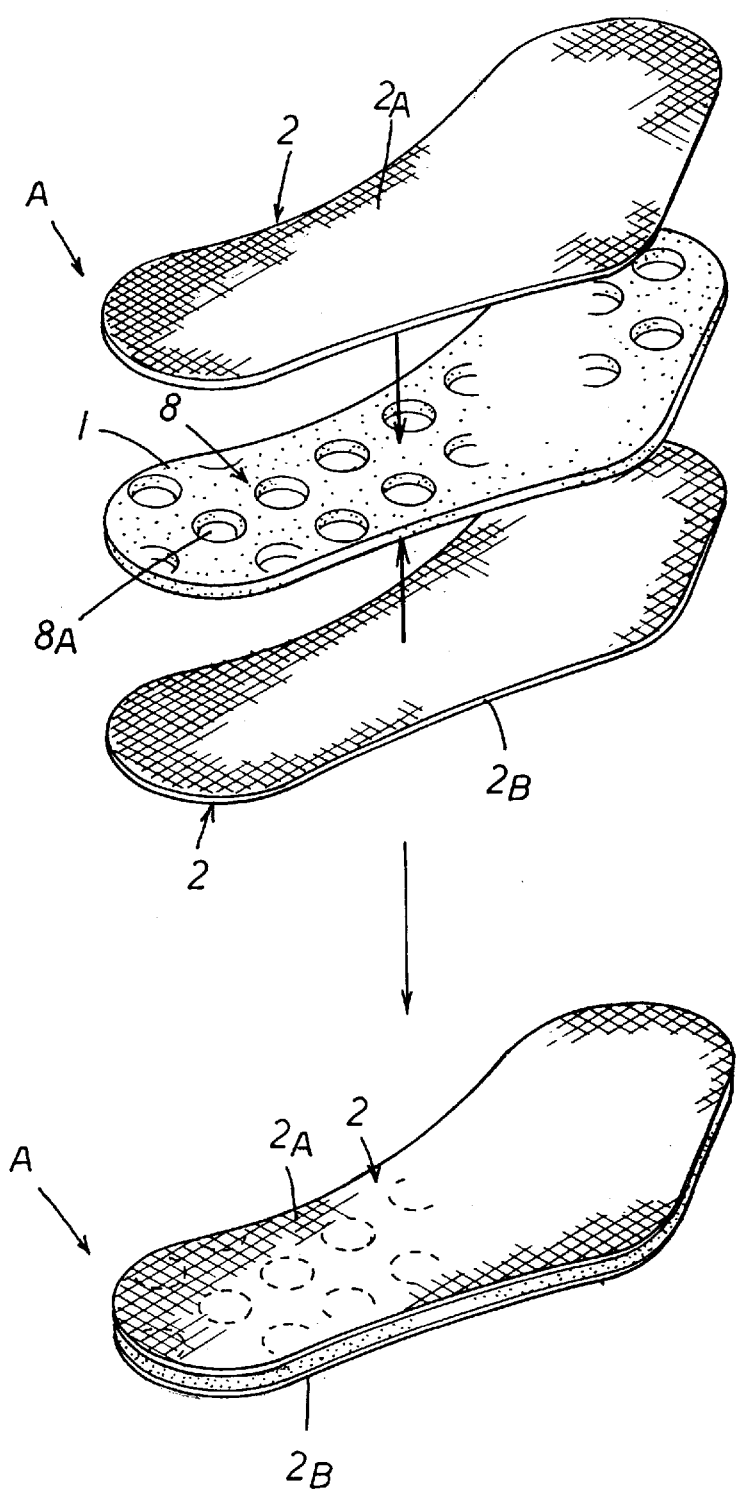
FIG. 13 is an illustrative developed perspective view showing another example in which the invention is applied to the third embodiment.
Figure 14:
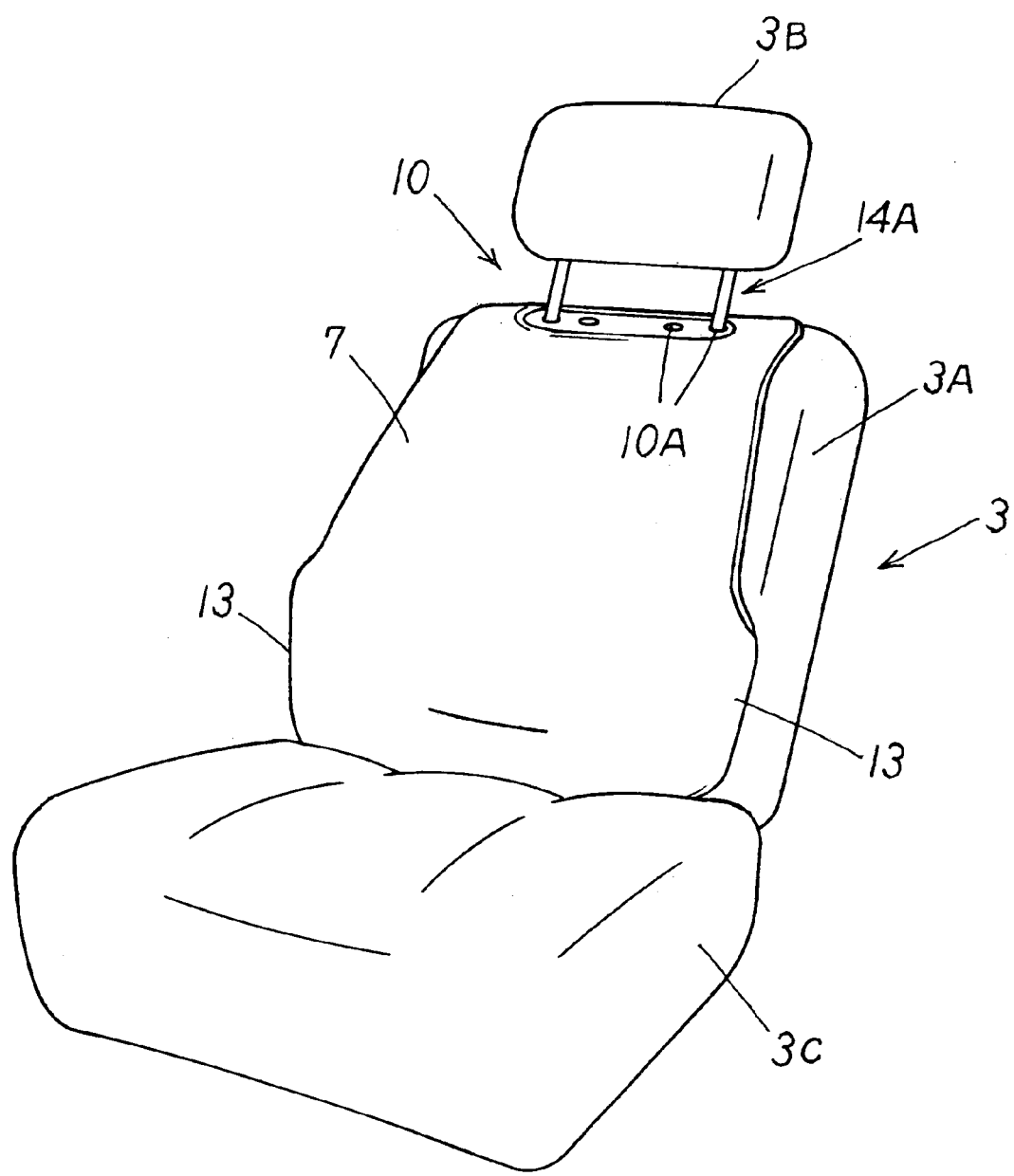
FIG. 14 is an illustrative perspective view showing a used condition in accordance with a fourth embodiment.
Figure 15:
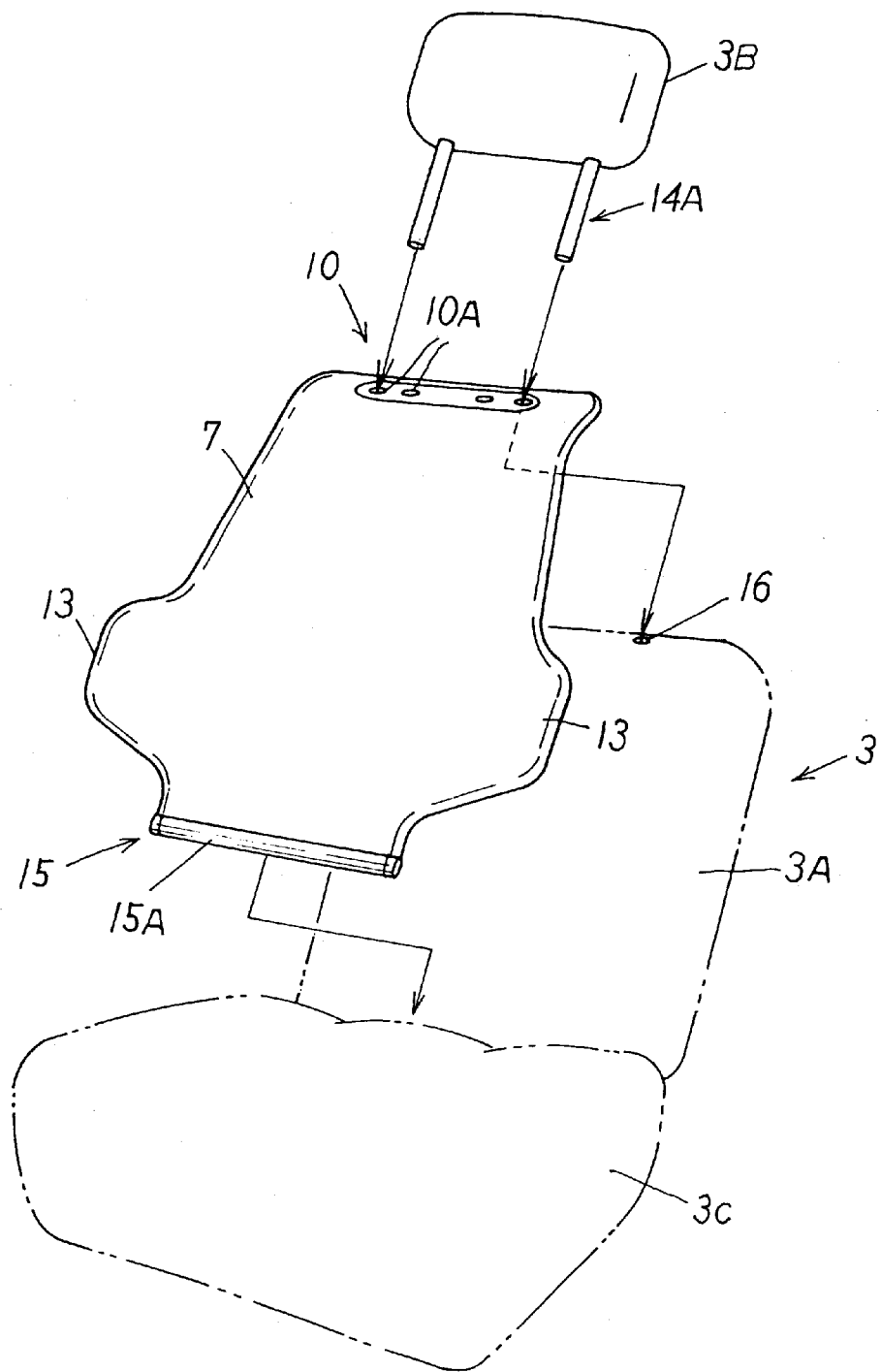
FIG. 15 is an illustrative perspective view showing an arrangement of a seat cover body in accordance with the fourth embodiment.
Figure 16:
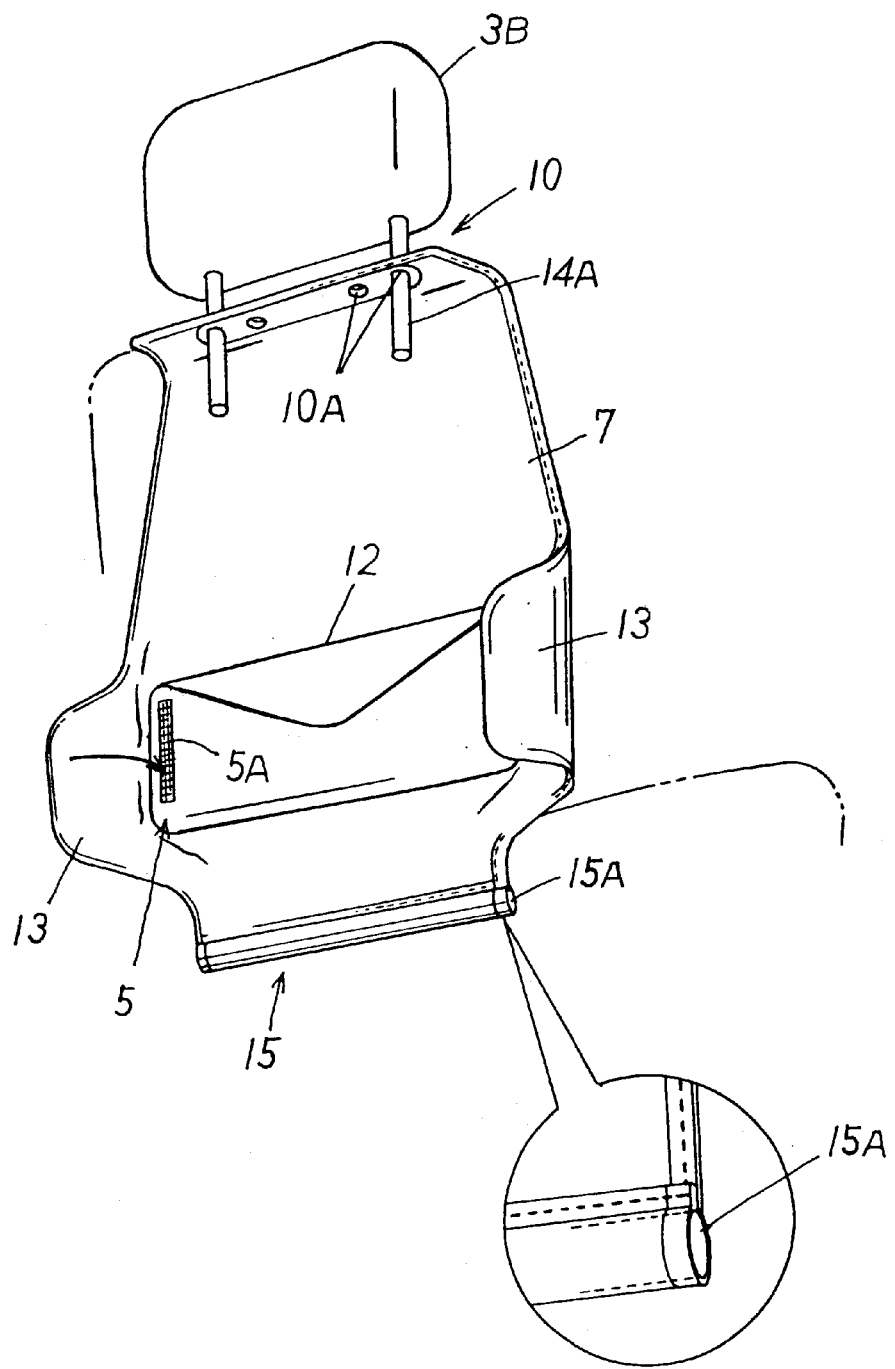
FIG. 16 is an illustrative perspective view as viewed from the back side showing the fixture of a receiving body containing a seat support onto the back surface of the seat cover member of the fourth embodiment.
Figure 17:
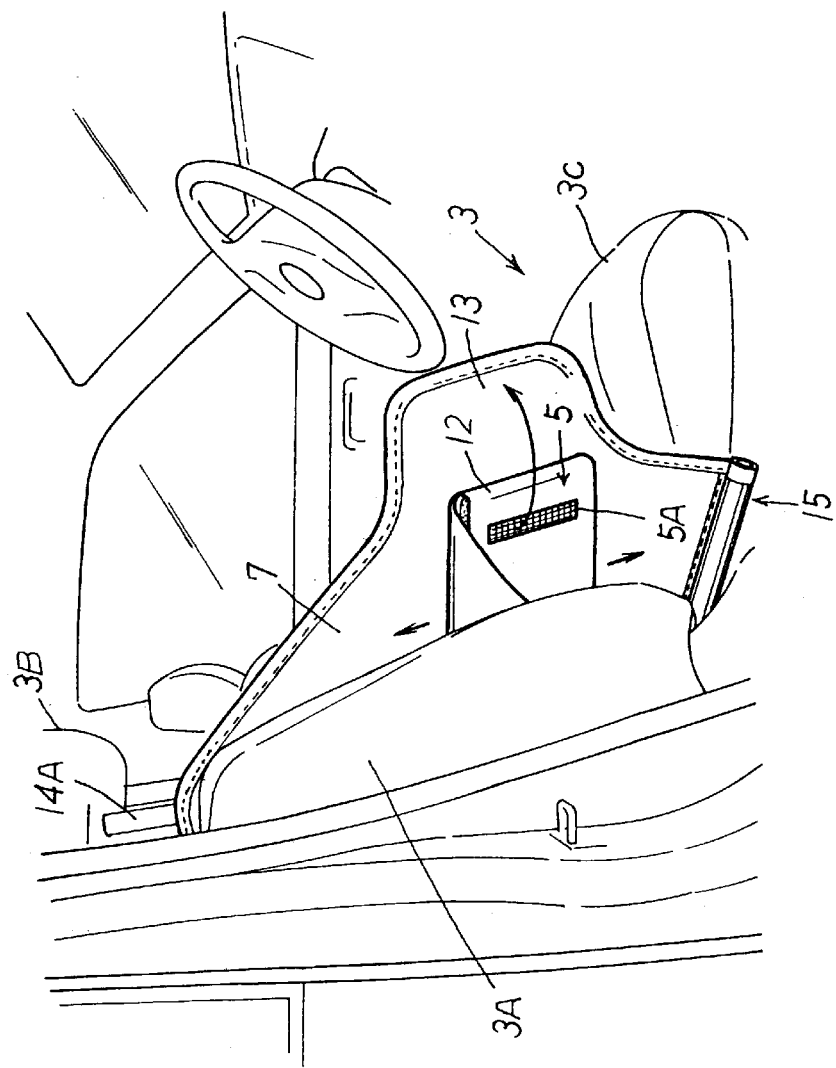
FIG. 17 is an illustrative perspective view on a seat side as viewed from the back side showing the adjustment and fixture of the receiving body containing the seat support onto the rear surface of the seat cover in accordance with the fourth embodiment.
Figure 18:
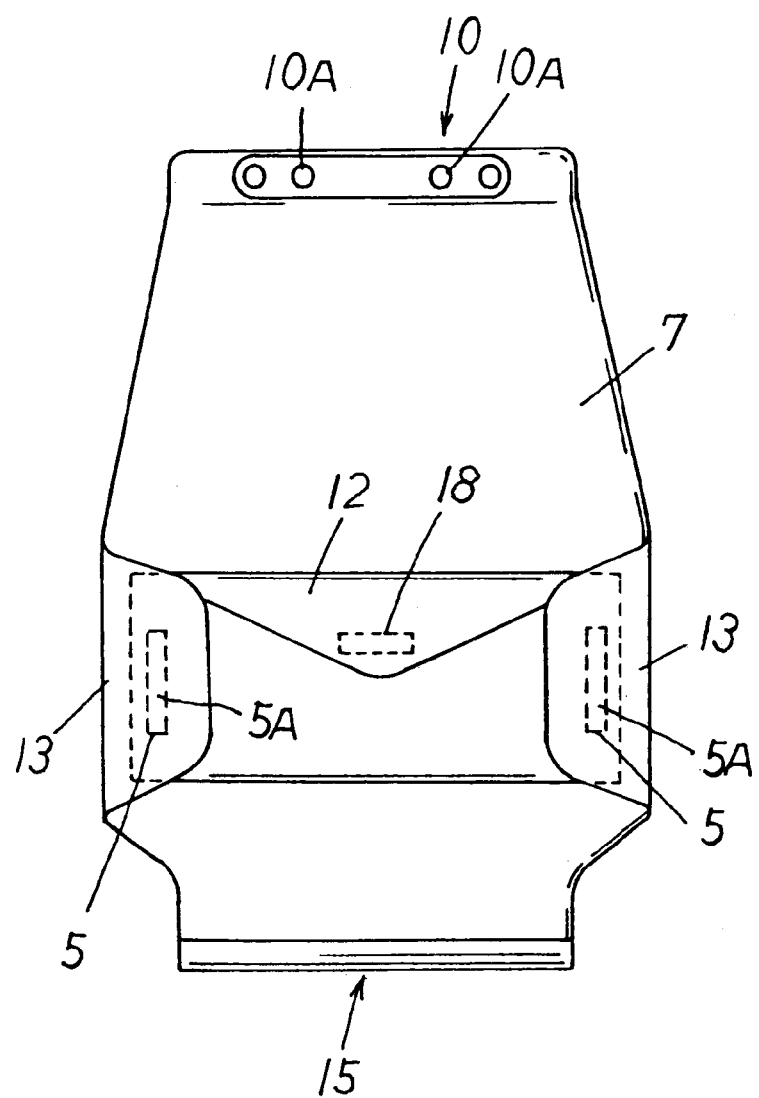
FIG. 18 is an illustrative bottom view of the seat cover member according to the fourth embodiment.

Also, in the foregoing embodiments, the invention has been applied to the seat support. However, for instance, as shown in FIG. 13, the invention may be applied to a shoe bottom support. Namely, as shown in FIG. 13, the upper and lower portions of a planar shoe bottom-shaped cushion bodies 1 are sandwiched by the coating members 2 impregnated with cured resin. The support is put on the shoe bottom and stamped by means of a foot to be cured. Also, in this case, since the upper and lower portions 2A, 2B of the coating members 2 are in direct contact with each other through a number of through holes 8A, the spring back of the above-described cushion bodies 1 is suppressed to be hard to work. The shape of the cushion bodies 1 is hardly changed.

Accordingly, if the coating members 2 have been cured to some extent, even if the depressing force of the foot is weakened and the foot is not moved to depress, then the shape is not changed. Thus, the curing holding property of the body support tool A is enhanced. As a result, a good fit feeling may be ensured by the cushion bodies 1 and at the same time, it is possible to reduce a period of time during which the foot depresses without any movement thereof.

Also, in a fourth embodiment shown in FIGS. 14 to 19, the invention is directed to a seat cover that may hold the seat support A. A seat support kit may be constituted by means of a container 12 receiving the seat support A to be cured in conformity with the sitting shape of the user. The body support tool A according to the invention is applied to an automotive seat 3.

The seat cover body 7 according to this embodiment will now be described.

A headrest engagement portion 10 as a seat holding means 10 is provided on the upper portion of the seat cover body 7 having such a form as to cover substantially the overall surface of the front surface of the backrest 3A of the seat 3. An engagement hole 10A into which headrest mounting rods 14A are inserted is provided in the headrest engagement portion 10 according to this embodiment.

Accordingly, in this embodiment, the headrest mounting rods 14A are removed together with a headrest 3B away from headrest mounting holes 16. For example, the headrest mounting rods 14A are again inserted through the engagement holes 10A into the headrest mounting holes 16 to mount the headrest 3B so that the engagement holes 10A are fitted by the headrest mounting rods 14A. Then, the seat cover body 7 is kept under the suspended condition to the headrest mounting rods 14A. The seat cover body 7 is arranged and held to the front surface of the backrest 1A like an apron.

Accordingly, in this embodiment, it is possible to easily mount the seat cover body 7 onto the backrest 3A by utilizing the attachment or detachment of the headrest 3B. Because of the apron type as described above, it is possible to enhance the generality to the seat shapes. Also, the user may mount that because of the simple structure.

Also, in this embodiment, in view of some cases where a distance between the right and left headrest mounting rods 14A is changed in accordance with a type of vehicle or a type of seat, two pairs (four in total) of engagement holes 10A are provided.

Incidentally, in this embodiment, the headrest engagement holes 10A are adopted as the seat holding means 10 of the seat cover body 7. However, it is unnecessary to use the type of the headrest engagement holes 10A. It is possible to simply tie the seat cover body to the backrest 3A. Also, it is possible to bind the seat cover body to the headrest 3B or the headrest mounting rods 14A without using the engagement holes 10A as the headrest engagement portion 10.

Also, the support holding means 5 for fixing detachably the rear surface of the seat cover body 7 and the receiving body 12 is provided on the rear surface of the seat cover body 7 or the outer surface of the receiving body 12 receiving the seat support A that gradually cures in contact with the air or moisture. The seat support A may be held in a predetermined position of the back surface of the seat cover body 7. In this embodiment, the right and left portions of the seat cover body 7 are folded back so that the folding back portions 13 that may cover the receiving body 12 fastened and fixed through the above-described support holding means 5 are integrally formed on the rear side of the seat cover body 2.

Moreover, in this embodiment, the rear surfaces of the right and left folded portions 13 of the rear portion of the seat cover body 7 and the receiving portion 12 receiving the above-described seat support A are fastened and fixed to each other by the above-described support holding means 5. The receiving body 12 may be fixed to the back surface of the seat cover body 7 and between the right and left folded portions 13.

Accordingly, in this embodiment, not only is the receiving body 12 receiving the seat support A disposed on the rear surface of the seat cover body 7 but also the right and left portions thereof are surrounded by the folded portions 13. As a result, the receiving portion 12 cannot been seen from the right and left sides of the seat 3 to enhance the esthetic appearance.

Furthermore, the folded portions 13 and the receiving body 12 are fastened and fixed to each other by the folded parts of the folded portions 13 on the right and left sides to thereby fix the receiving portion 12 to the back surface of the seat cover body 7.

Accordingly, it is easy to perform the fastening and fixing with a simple structure. The holding of the folded portions 13 is released so that the receiving member 12 may readily be moved between the folded portions 13. The holding position of the seat support A may readily be adjusted not only in the right and left direction but also up and down.

Accordingly, the position of the receiving body 12 may readily be moved and adjusted to be fixed while the user is sitting.

More specifically, fastening members 5A, such as velcro or male-female tape, may be mounted on the back surface of the seat cover body 7 and the outer surface of the receiving body 12 as the support holding means 5. However, in this embodiment, in order to simplify the structure, the material of the back surface of the seat cover body 7 (and the folded portions 13) is the material in which the fastening members 5A are retained. The fastening members 5A are provided in positions of the right and left outer surfaces of the receiving member 12 with which the folded portions 13 are folded and contacted. Accordingly, the receiving member 12 is brought into contact with the back surface of the seat cover body 7 between the folded portions 13, the folded portions 13 are folded back, and the back surfaces of the folded portions 13 is detachably mounted on the fastening members 5A of the receiving body 12 to thereby fix the receiving body 12.

Also, an insertion portion 15 to be depressed and inserted between the backrest 3A of the seat 3 and the seat 3B is provided at the lower end portion of the seat cover body 7.

More specifically, a rod-like member 15 such as a pipe is provided in a folded-back portion at the insertion piece end of the lower end portion of the seat cover body 7, and the rod-like member 15A is depressed and inserted so that the seat cover member 7 may be arranged and held on the front surface of the backrest 3A with good esthetic appearance and may be detached without easy lift of the seat cover member 7 kept under the suspended condition.

Figure 19:
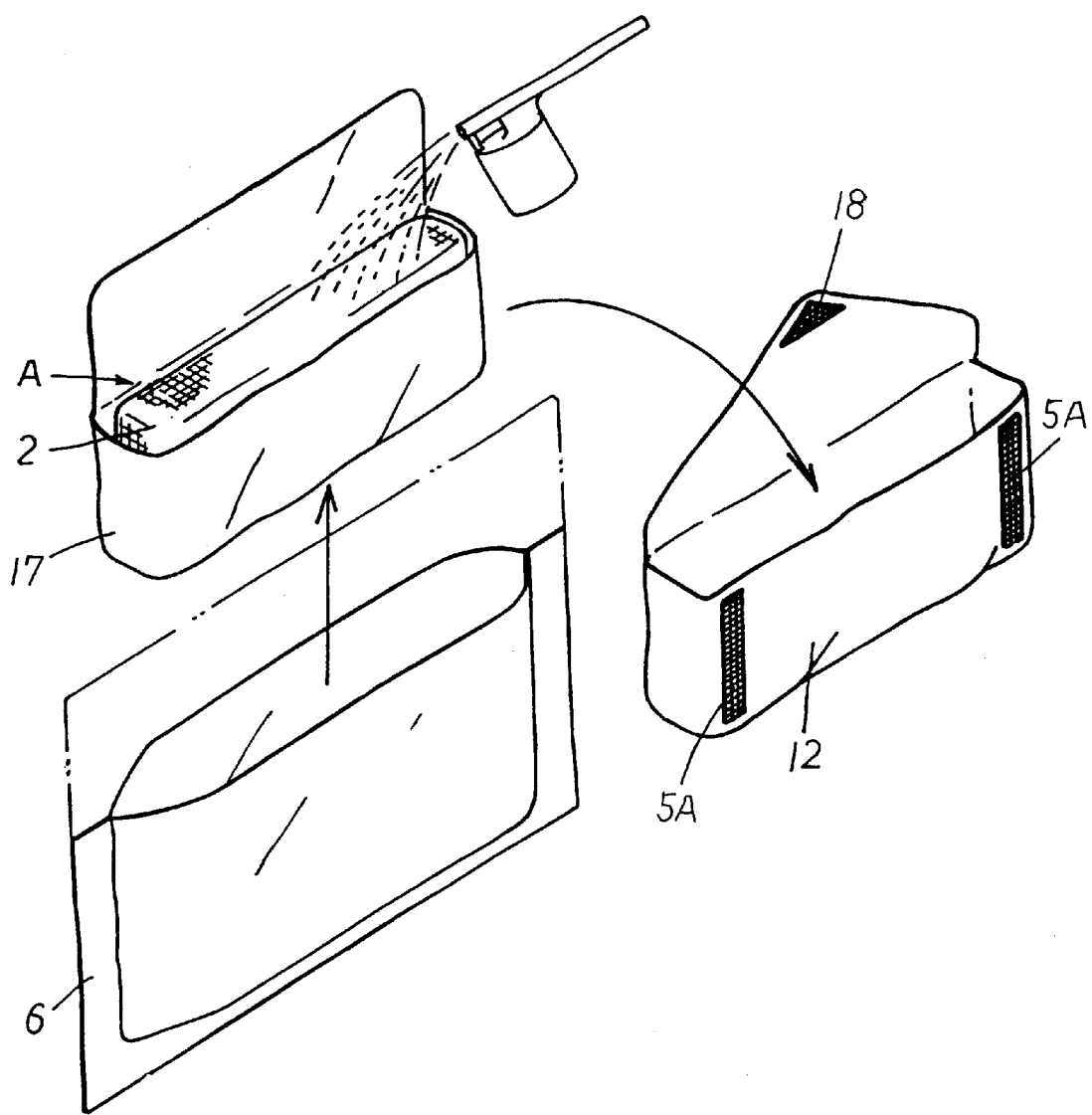
FIG. 19 is an illustration showing the pick-up of the seat support contained a handling receiving bag from an air-tight bag and moving it to the receiving member in accordance with the fourth embodiment.

The receiving member 12 is a cloth bag having permeability for receiving the seat support A that is easy to handle. As shown in FIG. 19, the opening portion (flap) is opened and the seat support A received in a receiving bag 17 made of water-splashing unwoven cloth for handling is inserted and received. Thereafter, the receiving member may be closed by means of a fastening member 18 such as a magic tape provided in the opening portion.

The above-described fastening members 5A each having a predetermined length are sewed and attached to positions where the right and left folded portions 13 on the right and left sides of the outer surface of the receiving body 12 are folded back and contacted with them.

Also, as shown in FIG. 19, the seat support A is received in an anti-humidity air-tight bag 6 made of aluminum foil or the like under the condition that the seat support A is received in the handling bag 17. The seat support A is removed from the air-tight bag 6 together with the handling bag 17 and brought into contact with air and moisture or spray to gradually start curing. The handling receiving bag 17 containing the seat support A is replaced in the above-described receiving member 12 and fixed to the back surface of the seat cover body 7.

BEST MODE OF THE INVENTION

A preferable mode of embodiment the invention (how to embody the invention) will now be briefly described with advantages with reference to the drawings.

The body support tool A (seat support A) is set, for example, between a position of the seat 3 where the portion H such as hips, a waist, a back or a neck, i.e., the portion that needs holding property of the seat and the body of the user. When the user depresses and deforms the seat support A while sitting on the seat, the sheet-like coating member 2 impregnated with cured resin is cured in conformity with the depressed and deformed shape, as a result of which the sitting shaped seat support A is held by the individual user.

Accordingly, it is possible to readily mold the seat in a sitting shaped seat support A. In addition, the portion of the seat support A in contact with the seat 3 side is also solidified in conformity with seat 3. Accordingly, the seat support A is set under the condition that it is hardly displaced in position to the seat 3. In addition, since the seat support A is the cushion body 1 having flexibility in content although the coating member 2 is cured to hold the shape, it is possible to obtain the seat support that is not simply hard with suitable flexibility. It is possible to ensure the good holding property and the good sitting feeling.

Also, the cushion body 1 is simply coated with the coating member 2 impregnated with the cured resin to thereby form the seat support A according to the present invention. Accordingly, this structure is feasible in design, and it is possible to provide less expensive products that are superior in mass productivity.

Also, if, for example, the sheet-like coating member 2 is formed by impregnating the cloth, for example, polyester cloth with the cured resin, it is very easy to impregnate the cloth with cured resin. Accordingly, it is possible to further easily form the sheet-like coating member 2.

Also, if, for example, resin that cures in a short period of time if exposed to the moisture or resin that cures by adding the catalyst liquid is used as the cured resin, there is no fear that the coating member 2 is cured in a normal condition. Accordingly, it is quite easy to handle the resin. In addition, once the resin starts to cure, the resin cures in a short period of time. The user does not need to take the same sitting posture for a long period of time upon the molding of the seat support A. It is possible to further easily form the sitting shape for the individual user.

Also, if, for example, the above-described cushion body 1 is formed of the flexible material in the form of a block, since the block-shaped cushion body 1 has the suitable thickness, it is possible to form the seat support A that may ensure a holding property enough to hold the body by molding. Also, with the cushion body 1 having a sufficient thickness, it is possible to ensure the extremely good sitting feeling.

Also, if, for example, the periphery of the above-described cushion member is coated with the cover member 4 having flexibility, the cover body 4 is touched upon handling, so that it is possible to prevent the user from touching the coating member 2 impregnated with the cured resin. Accordingly, it is possible to manually handle the seat support A according to the invention. It is possible to further easily handle the support.

Also, if, for example, the above-described seat support may be held by the support holding means 5 provided in a position of the seat 3 to which the human body portion such as hips, a waist, a back or a neck is contacted, it is possible to hold the seat support A according to the present invention readily on the portion of the seat 3 that needs the holding property. In addition, it is possible to further easily mold the seat support A under the condition that the seat support A is held by the support holding means 5. It is therefore possible to facilitate the handling.

Also, if, for example, the above-described coating member 2 is air-tightly received in an anti-humidity bag 6 and cured in a short period of time when the anti-humidity bag 6 is opened so that the coating member is exposed to humidity or the coating member 2 is cured in a short period of time when the anti-humidity bag 6 is opened and catalyst liquid is applied to the coating member, as far as the coating member is picked out of the anti-humidity bag 6, it is possible to prevent the coating member 2 from curing without fail and it is extremely easy to handle, recirculate or carry the seat support.

Figure 8:
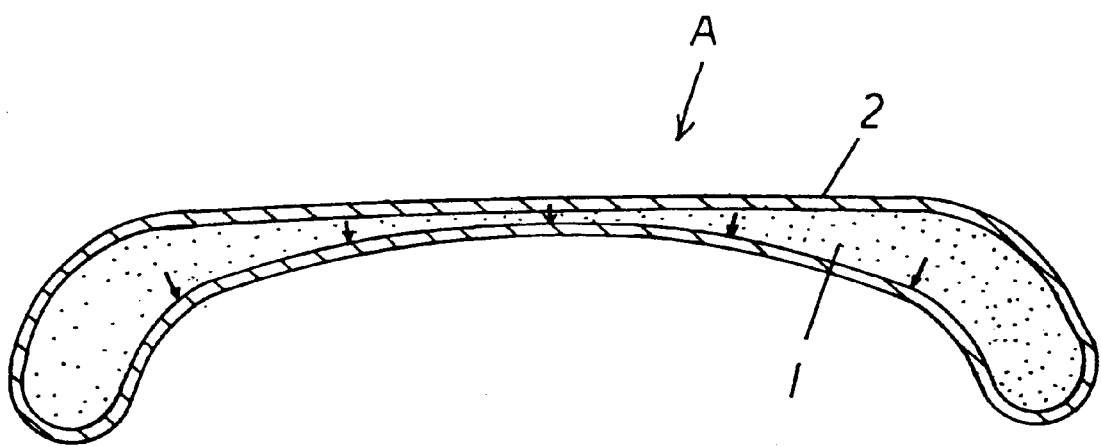
FIG. 8 is an illustrative cross-sectional view showing a spring back in accordance with the first embodiment.

Also, according to the present invention, since the seat support A is the cushion body 1 having flexibility in content although the coating member 2 is cured to hold the shape, it is possible to obtain the seat support that is not simply hard with suitable flexibility. It is possible to ensure the good holding property and the good sitting feeling. As shown in FIG. 8, on the contrary, a spring back (elastic restoration force) works due to the flexibility of the cushion body 1. Accordingly, when the coating member 2 cures to some extent but does not cure completely, if the depression of the human body part H to the body support tool A is stopped or the depression force is weakened, there is a fear that the shape of the body support tool A would be somewhat changed due to this spring back.

Figure 9:
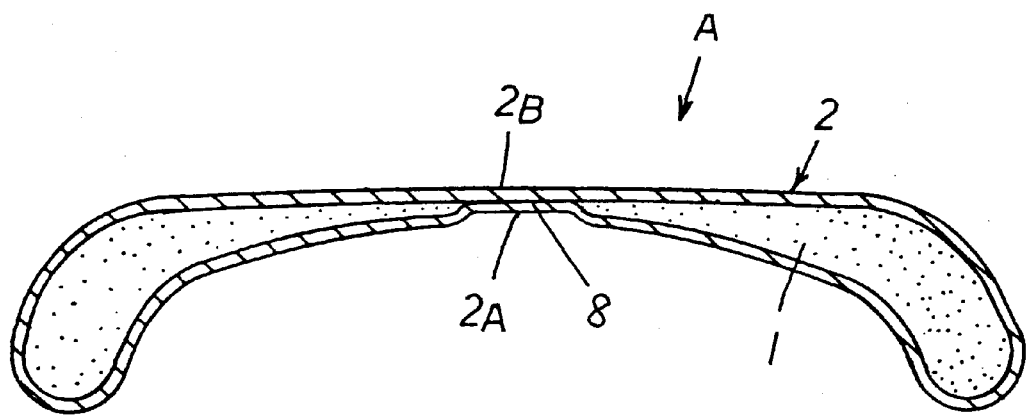
FIG. 9 is an illustrative cross-sectional view showing a used condition in accordance with a third embodiment.

However, according to the ninth aspect, a through hole 8A or a through-hole-like cutaway portion 8B is formed in the cushion body 1 or a shape of the cushion body 1 is set so that a portion 8 where a cushion material 1 is not present in a thickness direction is formed, and when the coating member 2 is contacted with the portion H of the human body and cured to be formed in conformity with the portion H, as shown in FIG 9, the coating member 2A on the human body contact side (top surface side) and the coating member 2B on the opposite side (bottom surface side) facing the coating member on the human body contact side are in contact with each other through the portion 8 where the cushion material 1 is not present and cured to be bonded together.

Accordingly, even if the coating member 2 is not completely cured, since the top and bottom portions of the coating member 2 are in direct contact and bonded with each other, the spring back of the above-described cushion member 1 is suppressed and hardly works and the shape of the cushion body 1 is hardly changed.

Accordingly, if the coating material 2 is cured to some extent, even if the depression force of the human body is weakened, the shape is unchanged thereafter. As a result, the curing holding property of the body support tool A is enhanced. As a result, it is possible to hold and mold the shape in conformity with the body portion H without fail, and it is possible to shorten the time when the human body must push. Namely, it is possible to quickly hold (mold) the shape in conformity with the body shape by which a good holding property or good sitting feeling may be ensured. It is therefore possible to provide a novel body support tool.

Namely, if the through hole 8A or the cutaway portion 8B is formed in the cushion body 1 and the portion 8 where the cushion material 1 is not present is formed in the cushion body 1, even if the thickness of the cushion body 1 is increased to a predetermined level in order to ensure the good cushioning property (suitable flexibility), the top and bottom portions of the coating member 2 are bonded directly to each other inside the cushion body 1. Accordingly, it is possible to suppress even strong spring back without fail. If, for example, the above-described cushion body 1 is formed of the flexible material in the form of a block, since the block-shaped cushion body 1 has the suitable thickness, it is possible to form the seat support A that may ensure a holding property enough to hold the body by molding. Also, with the cushion body 1 having a sufficient thickness, it is possible to ensure the extremely good sitting feeling. Thus, the cushioning property is enhanced so that the above-described spring back works remarkably. However, this may be suppressed by the bonding force due to the direct contact of the top and bottom of the above-described coating member 2. It is therefore possible to solve the problem of the spring back.

Incidentally, the present invention is not limited to such a seat support. For example, it is possible to apply the invention to a support tool that is used in the form of a shape that may be received in a shoe bottom by curing to the shape in conformity with the sole of foot H in contact with the sole of foot H, i.e., the shoe bottom support whose shape is held in conformity with the shape of the sole of user's foot to ensure the fitting feeling in response to the individual user's foot. Thus, it is possible to apply the invention in a variety of body support tools in the wide range.

Also, the seat cover body 7 is arranged and held to the back rest 3A of the seat 3 and the receiving member 12 receiving the seat support A through the support holding means 5 is fastened and fixed to the bottom surface of this seat cover member 7 so that the seat support A may be held in the portion that needs the holding property of the seat 3. The sitting posture of the user may be well protected by the support effect of the seat support A.

Accordingly, in the invention according to the eleventh to seventeenth aspects, it is possible to form the seat 3 having the sitting posture protecting effect with ease by using this seat cover. It is unnecessary to use a mounting member that causes non-esthetic property. It is possible to mount the components in good esthetic design appearance.

Namely, for example, the seat cover member 7 covering the front surface of the backrest 3A is used. Since the seat support A may be fastened or fixed to the back surface of this seat cover member 7 under the condition that the seat support A is not seen, it is possible to readily fasten and fix the seat support with esthetic appearance.

Also, for example, if the seat support A that is impregnated with the curing type resin that cures in contact with the moisture such as water or air (moisture contained in the air) as described above is used, this seat support A is picked up from the anti-humidity bag 6 (air-tight bag body 6) and received in the receiving member 12, this receiving member 12 is held on the rear side of the seat cover member 7 so as not to be seen and is cured while the user is sitting on the seat. It is possible to cure and form the sitting shape of the sitting individual to the seat support A with ease.

Namely, if the seat support A is sealed by the gas-tight bag 6, since the seat support A is not cured so far as the air-tight bag 6 is opened, it is possible to perform the reservation for a long period of time under this sealed condition. For this reason, for example, it is possible to stock and sell the products in car parts shops. Upon molding the seat support, the air-tight bag 6 is opened to the exposure of the air. In order to shorten the curing time, the support is dipped into water, or the spray is applied to the support while the support is received in the receiving member 12. The receiving member 12 is sealed and fastened or fixed to the back surface of the seat cover member 7. The seat support A is cured while the user is sitting on the seat 3 to provide the seat support A that may hold the sitting shape with ease. For example, the user (consumer) may cure and mold the seat support A for holding the sitting shape with ease by himself or herself. Incidentally, without using the seat cover, without using any special support holding means 5, it is possible to put the receiving member 12 receiving the seat support A directly on the seat surface (for example, the base portion of the backrest 3A of the deeper portion of the sitting surface).

With such an arrangement according to the present invention, it is possible to readily mold the seat in a sitting shaped seat support. In addition, the portion of the seat support in contact with the seat side is also solidified in conformity with the seat. Accordingly, the seat support is set under the condition that it is hardly displaced in position to the seat. In addition, since the seat support A is the cushion body 1 having flexibility in content although the coating member is cured to hold the shape, it is possible to obtain the seat support that is not simply hard with suitable flexibility. It is possible to ensure a secure hold and comfort. Also, the cushion body is simply coated with the coating member impregnated with the cured resin to thereby form the seat support according to the present invention. Accordingly, this structure is easily feasible in design, and it is possible to provide less expensive products that are superior in mass productivity. Thus, it is possible to provide a novel body support tool exhibiting these excellent effects.

Also, according to the second aspect of the invention, the sheet-like coating member is formed by impregnating the cloth, for example, polyester cloth with the cured resin, since it is very easy to impregnate the cloth with cured resin. Accordingly, it is possible to further easily form the sheet-like coating member. It is thus possible to provide a body support member that is extremely excellent in practical use.

Also, according to the third aspect of the invention, there is no fear that the coating member is cured in a normal condition. Accordingly, it is quite easy to handle the resin. In addition, once the resin starts to cure, the resin cures in a short period of time. The user does not need to take the same sitting posture for a long period of time upon the molding of the seat support. It is possible to further easily form the sitting shape for the individual user. Thus, it is possible to provide a novel body support tool exhibiting the excellent effect.

Also, according to the fourth aspect of the invention, since the block-shaped cushion body has the suitable thickness, it is possible to form the seat support that may ensure a holding property enough to hold the body. Also, with the cushion body having a sufficient thickness, it is possible to ensure the extremely good sitting feeling. Thus, it is possible to provide a novel body support tool exhibiting the excellent effect.

Also, according to the fifth aspect of the invention, the cushion body that exhibits the advantage of the invention according to the fifth aspect is easily structured to thereby make feasible. In addition, since the cushion body has the permeability, there is no fear that the cushion body is not humid since the cushion member has the permeability even if the user sits for a long period of time. It is possible to provide the body support tool that is further superior in practicality.

Also, according to the sixth aspect of the invention, the cover body is touched upon handling, so that it is possible to prevent the user from touching the coating member impregnated with the cured resin. Accordingly, it is possible to manually handle the seat support A according to the invention. It is possible to further easily handle the seat support according to the invention. It is thus possible to further easily handle the body support tool that is excellent in practicality.

Also, according to he seventh aspect, since substantially all the coating member is coated by the cover member having a predetermined thickness, it is possible to prevent the user from touching the coating member impregnated with the cured resin without fail. Accordingly, it is possible to manually handle the seat support A according to the invention. Because of the permeability of the cover member, there is no moisture even if the user sits on the seat for a long period of time. It is possible to provide the body support tool that is further superior in practicality.

Also, according to the eighth aspect, the coating material is not cured as far as the coating member is picked out of the anti-humidity bag and water is added to or moisture is contained in the coating member, it is possible to prevent the coating member from curing without fail and it is extremely easy to handle, recirculate or carry the seat support. It is possible to provide the body support tool that is extremely superior in practical use.

Also, according to the ninth aspect, since the seat support is the cushion body having flexibility in content although the coating member is cured to hold the shape, it is possible to obtain the seat support that is not simply hard with suitable flexibility. It is possible to ensure the good holding property and the good sitting feeling. Also, the cushion body is simply coated with the coating member impregnated with the cured resin to thereby form the seat support. Accordingly, this structure is easily feasible in design, and it is possible to provide less expensive products that are superior in mass productivity.

Furthermore, according to the invention, although the cushion body having such advantages and effects is coated with the coating member impregnated with the cured resin, even if the coating member is not completely cured, since the top and bottom portions of the coating member are in direct contact with each other, the spring back of the above-described cushion member is suppressed and hardly works and the shape of the cushion body is hardly changed.

Accordingly, if the coating material is cured to some extent, even if the depression force of the human body is weakened, the shape is unchanged thereafter. As a result, the curing holding property of the body support tool is enhanced. As a result, it is possible to hold and mold the shape in conformity with the body portion H, and it is possible to shorten the time when the human body must push. Namely, it is possible to quickly hold (mold) the shape in conformity with the body shape by which a good holding property or good sitting feeling may be ensured. It is therefore possible to provide the novel body support tool.

Also, according to the eleventh aspect, the seat cover body is utilized to thereby make it possible to very easily fix the body support tool (seat support) at the predetermined position. In addition, the seat cover body is arranged and held to the front surface of the backrest like an apron. It is easy to arrange and hold the seat cover member with wide applicability to any seat shape. It is thus possible to provide the novel seat cover that may hold the body support tool.

Also, according to the twelfth aspect, since the receiving member containing the seat support tool fixed to the rear surface of the seat cover member is further surrounded by means of the right and left folded portions, the receiving member is not seen also sidewise. Therefore, it is possible to readily fasten and fix the receiving member to the back surface of the seat cover member with esthetic appearance. Thus, it is possible to provide the extremely superior seat cover that may support the body support tool.

Also, according to the thirteenth aspect, since the receiving member is fixed to the back surface of the seat cover member by means of the right and left folded portions, it is possible to fix the receiving body with ease and good stability and to facilitate the fastening work. The user may readily adjust the fastening position of the receiving member by attaching/detaching while the user is sitting on the seat.

Also, according to the fourteenth aspect, since the seat cover member may be mounted by utilizing the headrest, the mounting work is further simplified with a simple structure. In particular, according to the fifteenth aspect, the mounting work is further simplified with a simple structure and the applicability is widened to provide the seat cover that may support the body support tool.

Also, according to the sixteenth aspect, the fastening work or positional adjustment of the receiving member containing the seat support tool is further facilitated to provide the body support tool that may support the seat support tool that is much superior in practical use.

Also, according to the seventeenth aspect, it is possible to fix and hold the lower end portion of the so-called apron type seat cover member with easy operation. It is possible to provide the body support tool that may support the seat support tool that is superior with easy attaching/detaching property.

What is claimed is:

1. A body support tool moldable to conform to a seating device, comprising:
   a cushion body having flexibility, said cushion body having a front side and a rear side; and
   a coating member impregnated with a cured resin, which covers the front side and the rear side of the cushion body,
   wherein the body support tool contacts a portion of a human body in order to be cured in conformity with the portion, wherein a front side of the cushion body faces the portion of the human body, and
   wherein the body support tool contacts a portion of a seating device in order to be cured in conformity with the portion of the seating device, wherein the rear side of the cushion body faces the portion of the seating device, so that the front side and the rear side conform in shape to the portion of the human body and the portion of the seat device, respectively.

2. The body support tool according to claim 1, wherein the coating member is formed of impregnating cloth material with cured resin.

3. The body support tool according to claim 1 or 2, wherein the cured resin has such characteristics that when the cured resin is exposed to moisture the cured resin is cured in a short period of time or when catalyst liquid is added to the cured resin, the cured resin is cured in a short period of time.

4. The body support tool according to claim 1 or 2, wherein said cushion body is made of elastic material in the form of a block having the front and rear sides and a plurality of side surfaces, and each of the surfaces is coated with said coating member.

5. The body support tool according to claim 4, wherein said cushion body is formed of a parallelepiped shaped foamed member having elasticity and permeability, and each side of said parallelepiped shaped cushion body is coated with said coating member.

6. The body support tool according to claim 1 or 2, wherein an outer surface of said coating member is coated with a cover member having elasticity.

7. The body support tool according to claim 6, wherein said cover member is made of foamed material having a predetermined thickness and having elasticity and permeability, and an outer surface of said coating member is coated by said cover member having the predetermined thickness.

8. The body support tool according to claim 1 or 2, wherein said coating member is air-tightly received in an anti-humidity bag and cured in a short period of time when the anti-humidity bag is opened so that the coating member is exposed to humidity.

9. The body support tool according to claim 1 or 2, comprising a seat support provided in a position where said seat support is brought into contact with a portion of a human body when the user sits on a seat or a chair.

10. The body support tool according to claim 1, wherein a fixed portion of the coating member is provided on at least one of the front and rear sides of the cushion body.

11. A body support tool comprising:

a cushion body having flexibility, said cushion body having a front side and a rear side; and a coating member impregnated with a cured resin, which covers the front side and the rear side of the cushion body, wherein the body support tool is brought into contact with a portion of a human body and cured in conformity with the portion, wherein a front side of the cushion body faces the portion of the human body, wherein a cutaway portion is formed in said cushion body or a shape of the cushion body is set so that a portion where a cushion material is not present in a thickness direction is formed, and when the coating member is contacted with the portion of the human body and cured to be formed in conformity with the portion, said coating member on the human body contact side and said coating member on the opposite side facing the coating member on the human body contact side are in contact with each other through the portion where the cushion material is not present and cured to be bonded together.

* * * * *